United States Patent

Hodges

[11] Patent Number: 6,083,891
[45] Date of Patent: Jul. 4, 2000

[54] WATER-BASED SWEEPING COMPOUND

[75] Inventor: Stephen H. Hodges, Cearwater, Minn.

[73] Assignee: Akona, LLC, Maple Plain, Minn.

[21] Appl. No.: 09/152,384

[22] Filed: Sep. 14, 1998

[51] Int. Cl.[7] ................ B08B 7/00; C09K 3/22; C11D 3/37
[52] U.S. Cl. .................. 510/216; 134/6; 134/7; 134/42; 510/434; 510/475
[58] Field of Search .............. 134/40, 6, 7, 42; 510/216, 475, 434, 462

[56] References Cited

U.S. PATENT DOCUMENTS

| | | | |
|---|---|---|---|
| 678,981 | 7/1901 | Rosenfeld | 252/88.1 |
| 788,042 | 4/1905 | Getz | 252/88.1 |
| 803,632 | 11/1905 | Singer | 252/88.1 |
| 939,689 | 11/1909 | Wolfgram et al. | |
| 1,057,923 | 4/1913 | Boddeker et al. | |
| 3,723,321 | 3/1973 | Ocala | 510/216 |
| 4,267,220 | 5/1981 | Yagi et al. | 428/96 |
| 4,836,945 | 6/1989 | Kestner | 252/88 |
| 5,223,165 | 6/1993 | Winstanley et al. | 252/88 |
| 5,286,399 | 2/1994 | Howell et al. | 252/88 |
| 5,397,492 | 3/1995 | Ossian et al. | 252/88 |
| 5,720,736 | 2/1998 | Hatsuda et al. | 604/368 |
| 5,753,604 | 5/1998 | Soldanski et al. | 510/214 |

*Primary Examiner*—Zeinab El-Arini
*Attorney, Agent, or Firm*—Richard E. Brink

[57] ABSTRACT

An oil-free, water-based sweeping compound containing sawdust, sand, and water has enhanced performance when an effective amount of a super-absorbent polymer, especially a cellulose/acrylate polymer, is incorporated. The resultant product is comparatively inexpensive, smells pleasant, maintains a desirable moist texture, and resists untimely moisture evaporation.

8 Claims, No Drawings

WATER-BASED SWEEPING COMPOUND

BACKGROUND OF THE INVENTION

This invention relates to so-called floor sweeping compounds, products that are broadly notoriously old. Such compounds ("compositions" might seem a more appropriate term) traditionally contain a blend of sawdust, sand, and a dust-absorbing liquid (typically petroleum oil); these compounds also generally include a preservative and, for aesthetic purposes, a dye. Handfuls of floor sweeping compound are broadcast over the area to be swept; after sweeping has been completed, the dust-laden compound is discarded in a sanitary landfill.

Many environmentally conscious states have recently passed laws forbidding the disposal of petroleum products in landfills. In an attempt to comply with such laws, applicant's assignee developed a sweeping compound in which petroleum oil was replaced with biodegradable acid oils derived from vegetable acid oils, e.g., soybean acid oil; see U.S. Pat. No. 5,286,399. While this product has enjoyed modest commercial success, it is more expensive than petroleum oil and does not age especially well.

It has long been recognized that replacing the oil in sweeping compounds with water would not only reduce cost but also provide a more environmentally acceptable product, with no oily residue remaining on the floor after sweeping. The rapid evaporation of water, coupled with its inability to impart long term stability and dust absorbing properties, has made such products difficult to use and resulted in limited commercial acceptance. For example, prior art water-based sweeping compounds can not be broadcast over an entire floor area, but must be spread in a line and quickly swept up.

Attempts have been made to remedy the deficiencies of water-based sweeping compounds by incorporating glycerin (U.S. Pat. No. 939,369), to which may be added hygroscopic calcium chloride (U.S. Pat. No. 1,057,923), but none of these products has proved commercially acceptable. Glycerin, for example, is both sweet and viscous, tending to attract pests and to remain on the floor after sweeping; further, its use adds significantly to the cost. Calcium chloride is a corrosive and deliquescent substance that not only is unpleasant to handle but also could corrode metals with which it comes in contact. Further, its ability to retard the evaporation of water is directly related to the humidity of the environment, and it is unreliable as a means of retaining moisture and yielding a consistent product.

BRIEF DESCRIPTION

The present invention provides a water-based sweeping compound that is inexpensive, easy to prepare, contains no hazardous chemicals, and is environmentally safe. Sweeping compounds made in accordance with the invention are neither irritating to handle nor attractive to pests. In accordance with the invention, water is combined with a "super-absorbent," a substance that will absorb at least 20 times (typically much more than 20 times) its own weight of water. The result of adding the super-absorbent is to dramatically retard evaporation of the water and thus not only to assure long term shelf life of an opened package but also to provide an extended "open time" when the sweeping compound is spread on a floor. Another significant advantage is that the water-based sweeping compound attracts dust and dirt more effectively than either the conventional petroleum oil-based or soybean acid oil-based compounds, resulting in a cleaner floor surface, with no oily residue to attract dust and dirt.

Super-absorbents, which are well-known today, are solid materials that are based on highly water-absorbing acrylate homopolymers or copolymers with such natural high polymers as starch or cellulose.

Currently preferred floor sweeping compounds include about 15–30 parts of water, 5–15 parts sawdust, 45–75 parts sand, and an effective amount (e.g., 1 part) cellulose/acrylate super-absorbent polymer, all parts being by weight. Preferably, small amounts of anti-foam agent (to reduce frothing during preparation of the product) and preservative (to eliminate the presence of mold and mildew) are also incorporated in the product. It may also be desirable to include dispersing agents to facilitate mixing.

DETAILED DESCRIPTION

The invention will be better understood by referring to the following illustrative but non-limiting examples, in which all parts are by weight unless otherwise noted:

EXAMPLE 1

A premix solution was prepared by blending 819.55 parts water, 7.93 parts nonylphenol polyethylene glycol ether non-ionic surfactant (commercially available from Union Carbide Chemicals and Plastics Company Inc., Danbury, Conn., under the trade designation "Tergitol NP-9.5"), 3.09 parts diethylene glycol methyl ether dispersant (commercially available from Dow Chemical Company, Midland, Mich., under the trade designation "Dowanol DM"), 0.38 part 2[(hydroxymethyl)amino]ethanol preservative (commercially available from Troy Chemical Corporation, Newark, N.J., under the trade designation "Troysan 174"), 0.42 part proprietary petroleum hydrocarbon blend defoaming agent (commercially available from Crucible Chemical Company. Greenville, S.C., under the trade designation "Foamkill 639J-OH") and 2.72 parts green dye (commercially available from Chromatech Inc., Canton, Mich., under the trade designation "D26023 Basic Green 0469.")

Next, a sweeping compound was prepared by adding 1.00 part super-absorbent fibrous cellulose/acrylate copolymer (commercially available from ReleasaGen Mfg., Inc., Delano, Minn. under the trade designation "ReleasaGen WBH") to a ribbon blender containing 13.90 parts premix solution and 10.01 parts water. Mixing was continued until the clumps of copolymer fiber were broken up and the fibers dispersed, after which 9.01 parts fine sawdust and 66.08 parts smooth 60-mesh silica sand were added and mixing continued until a uniform composition had been obtained. The sweeping compound prepared in accordance with this example felt moist but not greasy and had a pleasant "piney" odor. (In contrast, conventional oil-based sweeping compounds feel greasy and have an unpleasant odor.) When a package containing the compound of this Example was allowed to remain open for 24 hours, only minor drying of the surface occurred, while the remaining product retained a generous amount of moisture. When broadcast on a floor and allowed to remain for as long as 4 to 8 hours, the compound remained moist and able to pick up dust and function very effectively.

Unlike the prior art petroleum oil-based sweeping compounds, which could damage asphalt, rubber tile, or varnished wood surfaces, one of the great advantages of the product of this Example 1 was its ability to be used on almost any type of hard flooring. Oil-based sweeping compounds also tend to leave an oily film that attracts dust and will track to adjacent floor surfaces, increasing floor maintenance costs. The water-based sweeping compound of this Example 1 does not leave a residual film and hence does not suffer from such disadvantages. The product of Example 1 contains neither oil nor hazardous materials and is thus acceptable in all landfills.

EXAMPLE 2

Example 1 was repeated using 0.5 part "ReleasaGen WBH. The product functioned effectively but tended to dry somewhat more quickly. Products containing 0.75 part "ReleasaGen WBH" were nearly as effective as the product of Example 1. Products containing 0.25 part "ReleasaGen WBH" showed an improvement over water-based sweeping compounds containing no super-absorbent but were considered marginal from a commercial viewpoint.

EXAMPLE 3

Example 1 was repeated using 1.5 part "Releasagen WBH." Results were about the same as obtained with the product of Example 1. Similar results were obtained when the amount of "Releasagen WBH" was increased to 2.5 parts, 5.0 parts, and 7.5 parts, but no advantage was noted, the product's cost was proportionately increased, and it tended to feel moister than was considered desirable.

From the results of Examples 2 and 3 it was concluded that products containing at least 0.25 part of super-absorbent polymer were useful and that products containing 0.75 part to 1.25 parts worked very well without unduly increasing the cost.

EXAMPLE 4

Example 1 was repeated, substituting "A-100," a powdered starch/acrylate super-absorbent polymer commercially available from Grain Processing Corporation, Muscatine, Iowa. for the "ReleasaGen WBH." Although the resultant floor sweeping compound had good water retention, it was less free-flowing, displaying a paste-like consistency.

EXAMPLE 5

Example 4 was repeated, substituting "G-400." a powdered acrylate homopolymer commercially available from Grain Processing Corporation, for the "A-100." Results were comparable.

COMPARATIVE EXAMPLE

Example 1 was repeated, omitting the "ReleasaGen WBH." If used promptly, the resultant sweeping compound worked well, but it quickly dried to an unsatisfactory powdery consistency in an opened package or when allowed to remain on the floor for as little as 15 minutes after being spread preparatory to sweeping.

Without being bound by any theory, applicant believes that the product of Example 1, which is currently preferred, owes its success to the presence of cellulosic fibers, which may tend to enhance the effectiveness of the super-absorbent polymer. Speaking in round numbers, the product of Example 1 contains about 25 parts water, 10 parts sawdust, 65 parts sand, and 1 part super-absorbent polymer.

Although this invention has been described with the aid of illustrative examples, it will be readily appreciated that numerous changes can be made without departing from the spirit of the invention. For example, other super-absorbent polymers may be employed, and satisfactory substitutes for the specific dispersants, surfactants, defoamers, preservatives, dyes, etc., will readily occur to those skilled in the art.

What is claimed is as follows:

1. A sweeping compound consisting essentially of sawdust, sand, water, and an effective amount of a super-absorbent polymer, said compound being resistant to evaporation of the water.

2. The sweeping compound of claim 1 wherein the super-absorbent polymer constitutes at least about 0.25% of a total weight of the compound.

3. The sweeping compound of claim 1 wherein the super-absorbent polymer is an acrylate polymer and constitutes from about 0.75% to 1.25% of the total weight of the sweeping compound.

4. The sweeping compound of claim 3 wherein the super-absorbent polymer is in a form of microscopic fibers.

5. The sweeping compound of claim 4 wherein the super-absorbent polymer is a cellulose/acrylate polymer.

6. A pleasant-smelling oil-free water-based sweeping compound comprising about 15–30 parts water, 5–15 parts sawdust, 45–75 parts silica sand, and an amount of super-absorbent polymer effective to retard drying of said compound, whereby the compound can be spread over a floor and remain usable for at least 4 hours.

7. The sweeping compound of claim 6, additionally containing surfactant, preservative, anti-foam material, and dye.

8. A pleasant-smelling grease-free sweeping compound consisting essentially of about 25 parts water, 10 parts fine sawdust, 65 parts sand, and 1 part of a super-absorbent cellulose/acrylate polymer, said compound being resistant to evaporation of the water, whereby excellent shelf life and open time result, superior dust control is obtained, whereby said compound can be spread over a floor and no oily residue remains on the floor after sweeping.

* * * * *